United States Patent [19]

Yerby et al.

[11] Patent Number: 4,992,999
[45] Date of Patent: Feb. 12, 1991

[54] SUBMARINE DRONE FOR CARRYING A BARREL STAVE-TYPE TRANSDUCER ARRAY

[75] Inventors: Henry T. Yerby, Pasadena, Calif.; Thomas G. Lang, State College, Pa.; Horace E. Karig, Pasadena, Calif.

[73] Assignee: The United States of America as represented by the Secretary of the Navy, Washington, D.C.

[21] Appl. No.: 569,560

[22] Filed: Jul. 28, 1966

[51] Int. Cl.[5] ................................ G01S 3/80
[52] U.S. Cl. ..................... 367/130; 367/106
[58] Field of Search .............. 114/20, 23, 16, 10.05, 114/235, 235.2, 20.1; 340/4.5, 5, 8 S, 3 T; 367/130, 106, 188, 173

[56] References Cited

U.S. PATENT DOCUMENTS

| | | | |
|---|---|---|---|
| 2,838,850 | 6/1958 | Stephenson et al. | 367/106 |
| 2,963,543 | 12/1960 | Liuk et al. | 114/330 |
| 3,056,104 | 9/1962 | DeKanski et al. | 367/131 |
| 3,059,217 | 10/1962 | Boswell | 367/173 |
| 3,131,664 | 5/1964 | McInvale | 114/333 |
| 3,134,353 | 5/1964 | Pederson et al. | 114/337 |
| 3,144,848 | 8/1964 | Knott et al. | 367/106 |
| 3,159,806 | 12/1964 | Piasecki | 367/106 |
| 3,182,623 | 5/1965 | Lehmann | 114/332 |
| 3,194,201 | 7/1965 | Lang | 114/20.1 |
| 3,722,445 | 3/1973 | Karig et al. | 114/337 |

Primary Examiner—Thomas H. Tarcza
Assistant Examiner—Daniel T. Pihulic
Attorney, Agent, or Firm—Harvey Fendelman; Thomas Glenn Keough

[57] ABSTRACT

A submarine drone has special hydrodynamic performance features for operating as a moving underwater platform for underwater transport of a barrel stave type sonar receiving transducer and a pole type sonar transmitting transducer with highly precise vertical alignment. The body of the submarine comprises a generally spherical pressure hull for containing propulsion plant and electronic components. The barrel stave transducer is affixed about the upper half of the pressure hull. An acoustically transparent false wall forms a spherical hydrodynamic wall over the pressure vessel and transducer. The false wall also forms a tail cone projecting from the rear side of the submarine. The tail cone contains an annular channel which takes in boundary layer water from the spherical portion of hydrodynamic wall and conducts it back to a pump jet at the extreme rear of the tail cone. A fixed tail boom emerges from the center of the pump jet structure and extends rearwardly. Cruciform control surfaces append from the tail boom. The pole transducer projects from the top of the spherical body and has a freely pivoting fairing made of acoustically transparent material thereabout.

3 Claims, 1 Drawing Sheet

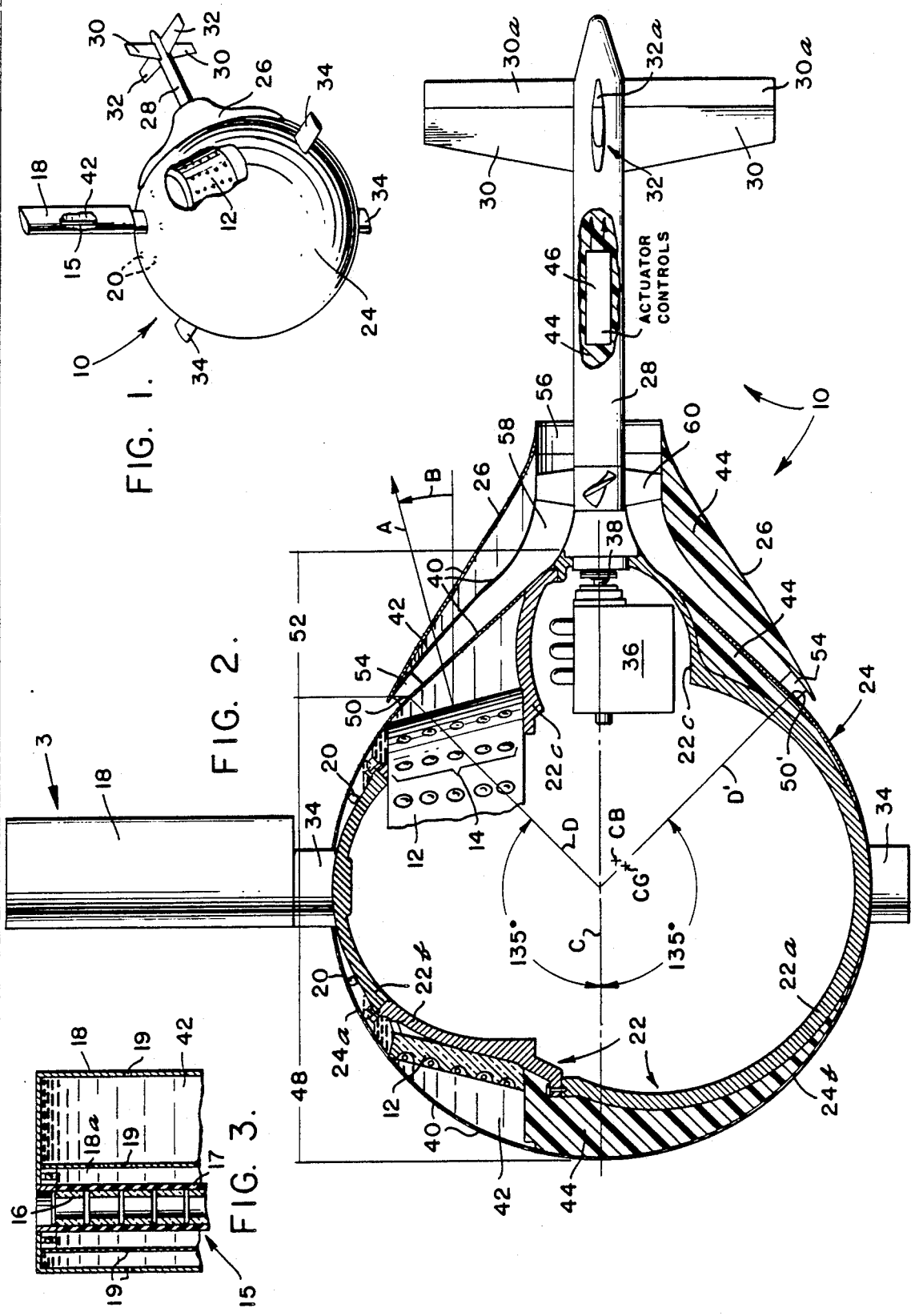

SUBMARINE DRONE FOR CARRYING A BARREL STAVE-TYPE TRANSDUCER ARRAY

The invention described herein may be manufactured and used by or for the Government of the United States of America for governmental purposes without the payment of any royalties thereon or therefor.

This invention relates to a drone submarine, for operation at depths down to 6,000 feet or below, and of special utility in carrying an annular omnidirectional transducer.

The conventional approaches in designing underwater vehicles for operation at depths of the order of 6,000 feet or below, and with maneuvering capabilities commensurate with surface ships, have been to place the components which are to be protected from the water in a number of spherical or spherically faired pressure capsules, and to arrange these capsules longitudinally in a conventional elongated streamlined-shaped submarine. One such prior art deep submergence vehicle has been illustrated in U.S. Pat. No. 3,148,508 to H. E. Karig. It has been proposed in connection with an ASW surveillance system that a large annular omnidirectional transducer array, such as disclosed in co-pending application Ser. No. 474,541, filed July 21, 1965, entitled "Sonar Receiving Array for Operation in Deep Water," by J. M. McCool and S. F. Sullivan, be carried by a drone vehicle at depths down to 6,000 feet. More particularly, that annular transducer is shaped as a truncated bone having a height of two feet and is four feet in diameter at its top. One important utility of that system is to provide surveillance for a convoy of marine transport craft having a nominal speed of 15 knots. The only practical way to mount such a transducer to a conventionally-shaped underwater vehicle would be to carry it on the exterior of its upper surface. In order to propel a craft having such a protuberance with the depth, speed, maneuvering, trim, and duration of submerged operation requirements of the mentioned surveillance system, it is estimated that a submarine having a total displacement of approximately 16 tons or 500 cubic feet would be needed. For speeds commensurate with marine transport (15 knots), such a craft would require a propulsion engine rating of 90 horsepower. Obviously, any significant reduction in the displacement and horsepower requirements for the drone craft can very significantly affect the expense, complexity, and logistic factors involved in that referenced method and apparatus for sonar surveillance.

An object of the invention is to provide a drone submarine having a novel basic hydrodynamic structure which is of special utility in an annular omnidirectional transducer of the type described, at depths of the order of 6,000 feet, and which for that purpose requires far less displacement and substantially lower horsepower than the basic hydrodynamic structures heretofore available in the prior art.

Another object is to provide a drone submarine in accordance with the previous objective, which is capable of speed and maneuvers commensurate with a surface vessel in a convoy of marine transport-type vessels, and which has sufficient stability in pitch and yaw to maintain the axis of the transducer accurately aligned relative to the vertical direction.

Other objects and many of the attendant advantages of this invention will be readily appreciated as the same becomes better understood by reference to the following detailed description when considered in connection with the accompanying drawings wherein:

FIG. 1 is a perspective view of the drone submarine forming the subject of the invention;

FIG. 2 is a longitudinal section through the drone submarine of FIG. 1; and

FIG. 3 is a longitudinal section of a detail indicated by arrow 3, FIG. 2.

Referring now to the drawing, and in particular to FIG. 1, the subject of the invention is a drone underwater vehicle or submarine 10, having a design depth of 6,000 feet, and of special utility in carrying an annular omnidirectional receiving transducer unit 12. This annular transducer unit, described in greater detail in the previously cited co-pending application Ser. No. 474,541 forms a frustoconical surface containing a ring of vertically aligned linear transducer array staves 14. The frustoconical surface is inclined by cone half angle of 15°, so that the axis of directionality A of the staves in the vertical plane is upwardly inclined by an angle B. Vehicle 10 also carries a pole-shaped transmitting transducer 15 which projects vertically from the top of the vehicle. As shown in FIG. 3, the pole-shaped transducer consists of a stack of separated electrostrictive rings 16 surrounded by boot 17 made of an acoustic match material. The electrostrictive rings 16 are preferably made of prestressed and oven baked-type electrostrictive material, which can resist the ambient pressure differential across the wall, and the interior is sealed and contains air. This type of material is commercially available from Channel Industries, Inc. of Santa Barbara, Calif. Transducer 15 is surrounded by a freely pivoting fairing 18 having a standard 25 percent symmetrical airfoil section. The pivot point is forward of the air foil section center of lift. Fairing 18 is made of thin aluminum having openings 19 so that it is freely flooded. An annular space 18a is formed between the transducer 15 and the fairing, and this space is also flooded through openings in the aluminum wall of the fairing. As is well known, the flooded thin walled construction is substantially acoustically transparent. A number of small acoustic transducer units 20 are mounted in a ring around the top of the vehicle for acoustic telemetering links with a surface vessel (not shown). This surface vessel is a "mother ship" which serves as the command and sonar signal processing station for the drone vehicle. These telemetering links communicate command signals for maneuvering the drone from the surface ship, communicate the output of the sonar transmitter and receiver unit in the drone to the surface ship, and also communicate positional information about the drone to the surface ship.

The important structural parts of the drone vehicle comprise a pressure hull 22 which also serves as the basic body frame of the vehicle to which all other parts are appended, an outer hydrodynamic casing 24, which gives the main body of the vehicle an approximately spherical configuration, an after body shroud 26, and a tail boom 28 which projects from the vehicle's rear end. Tail boom 28 carries pairs of rudder and elevator surfaces 30 and 32, respectively, at the rearmost end. Elevator surfaces 30 and 32 contain deflectible control tabs 30a and 32a. The afterbody shroud 26 and tail boom 28 are both aligned about longitudinal axis C of the vehicle. Four small symmetrical airfoil sectioned wings 34 are mounted in cruciform relationship about axis A in the horizontal and vertical planes, and near the point of maximum diameter of the vehicle.

Pressure hull 22 is itself a composite member comprising a lowermost portion 22a, which is the largest component portion of the casing and which broadly has the configuration of the lower two-thirds of a sphere. A smaller uppermost portion 22b has the configuration of a dome, and a smaller rearwardly extending portion 22c is shaped as a generally spherically faired protuberance. Lowermost portion 22a contains the vehicle's energy source (not shown). This energy source is of a type which does not experience change of weight as the energy is expended. A preferred form of energy source, which analytically shows the best endurance potential is a heat storage bed of the type consisting of a meltable salt mixture having substantially no change of volume between its liquid and solid state, such as the mixture disclosed in co-pending application Ser. No. 500,389, filed Oct. 21, 1965, now U.S. Pat. No. 3,722,445 entitled "Underwater Molten Heat Storage Boiler," by H. E. Karig and G. DeVries. Such form of energy source would be used with a closed cycle-type steam propulsion engine, and in that instance the condenser system (not shown) is preferably outside the pressure hull where it may be suitably adapted to use ambient water as its coolant medium. Another form of energy source which does not change weight as power is expended is the conventional storage battery. The dome-shaped portion 22b of the pressure hull contains the electronic equipment (not shown), including the transmitter or modulator unit which drives the sonar transmitting transducer 16, the preamplifier 12, and the telemetering units for communication of maneuvering commands, sonar system output and positional information signals. Dome shaped portion 22b also forms a structural backing to which the transducer unit is mounted. The rearwardly extending portion 22c houses a suitable propulsion engine 36, and drive shaft 38. The hydrodynamic casing 24 is formed of two sections having distinct structures. One of these sections is an upper section 24a made of aluminum and which, in general, surrounds the dome portion 22b of the pressure hull. This aluminum upper section 24a contains a number of small openings 40, so that the adjacent spaces between the hydrodynamic hull 'nd the pressure hull become flooded by seawater 42 at ambient pressure when vehicle 10 is submerged. The other of the two sections of the hydrodynamic casing is a lower section 24b made of fiberglass laminate, and the space between this section of the hull and the pressure hull is filled with a buoyancy epoxy and glass microshpere material 44 having a high compressive strength, and a modulus resulting in a small volume change under the compression experienced at depths of the order of 6,000 feet. One satisfactory material is disclosed in co-pending application Ser. No. 300,395 filed August 6, 1963, by Ray F. Hinton. Tail shroud 26 is formed from aluminum skin with a hollow interior. The lower half of afterbody shroud 26 is filled with buoyancy material 44, and the upper half flooded with ambient seawater 42, which enters through flooding openings 40. Being thusly flooded, the upper half of shroud 26 forms a substantially acoustic transparent structure with respect to operation of receiving transducer unit 12. The interior of the tail boom 28 contains the actuator 46 for controlling the deflection of rudder and elevator tabs 30a and 32a, with the remaining space therein filled with buoyancy material 44. Vehicle 10 is constructed and arranged to have a small net positive buoyancy, of an order of 50 pounds, throughout its range of operating depths.

Hydrodynamic casing 24 is formed of sections having two different geometrical configurations in the axial direction. The geometrical configuration of the outer surface of the casing is spherical for a forward section 48, extending from its front end tip back to a transverse station 50,50' located at the intersection of the casing and radii lines D,D', located 135° to either side of the longitudinal axis C. A rear axial section 52 of the casing, located aft of transverse station 50,50', forms a rearwardly converging frustoconical outer surface. The rear end of section 52 merges with the lateral wall of the tail boom 28. After-body shroud 26 is mounted in position with its forwardmost edge starting adjacent to transverse station 50,50'. The front end of the shroud is mounted to casing 24 by a set of four (only two are shown) equiangularly-spaced faired struts 54, and its rear end by a cruciform arrangement of hydrofoil elements 56. The space between the afterbody shroud and the hydrodynamic casing forms an annular channel 58, which serves as a boundary layer induction intake and a pump jet duct channel. A conventional pump jet blade 60, connected to drive shaft 38, is journaled for rotation about the tail boom axis just forward of the fixed hydrofoil elements 56. In addition to serving as supports, the fixed hydrofoil elements 56 are suitably configured, including provision of a twist in the direction of their radial length, to serve as pump jet stator elements which co-operate in the conventional manner with blades 60 to straighten the flow from the rotor, and recover otherwise lost energy. Use of stators 56 also prevent a net rolling moment or torque in the total pump jet system and thereby provides a torque balanced system.

In addition to its function of forming a jet pump duct, channel 58 serves a second, and very significant function, namely the prevention of boundary layer separation. It has been experimentally and analytically determined that when a spherical body moves through the water with turbulent flow conditions adjacent to its surface, the approximate location of where the boundary layer separation occurs is at the sphere's transverse station 50,50' corresponding to the 135° radii lines D,D'. Transverse station 50,50' corresponds to that point on a sphere where, due to the adverse pressure gradient, the boundary layer naturally separates from the body. For published verification of this behavior, reference is made to NACA Technical Memorandum No. 388. Thus, by locating the front end of shroud 26, and in turn channel 58, forward of the transverse station where boundary layer separation occurs, the boundary layer is instead inducted into the channel and its separation effectively never occurs. A very substantial portion of the form drag associated with motion of a pure spherical shape through water is the result of separation of the boundary layer at the near surface of the sphere. It has been analytically determined, and experimentally substantiated that the described boundary layer induction feature reduces form drag by a factor of five (approximately), and this in turn cuts the propulsion power requirements by an appreciable factor. However, because of energy losses in the duct and the need for lifting and stabilizing surfaces, the percentage gain is more modest than that indicated above.

As will be apparent from the drawing, vehicle 10 forms an extreme compact vehicle for carrying unit 12, particularly in light of the fact that the performance characteristics of the corresponding physical embodiment meet the depth, speed, maneuvering, trim, and duration of submerged operation requirements of the ASW surveillance system of the concurrently filed application. For example, the embodiment illustrated in the drawing has a designed displacement of 6.4 tons, or 200 cubic feet, and can meet performance requirements using a 45 H.P. engine. This is in contrast to the estimated need for a 16 ton, 90 H.P. craft using conventional submarine design approaches. This reduction in size and horsepower requirements is largely the result of the compactness of structure possible through use of a generally spherical configured pressure hull, which in turn is only possible because channel 58 very significantly reduces the drag of a spherical body by induction of the boundary layer into the pump jet system before it separates from the body.

Another important aspect of the invention is that there are provided a number of stability and hydrodynamic control features, which act in combination to permit the near spherically-shaped hydrodynamic configuration of the vehicle to operate with a zero pitch attitude over a wide range of forward speeds and, under maneuvers in azimuth which are commensurate with the maneuvering capability of any surface vessel serving as mother ship. The difficulty and problems associated with achieving satisfactory control and stability of movement of a spherical body are well known. The combination of features achieving stability and control are as follows. The four wings 34 in the pitch and yaw planes overcome most of the centrifugal force due to turning in vertical or horizontal planes, and most of the net buoyancy in the vertical plane. Rudder and elevator surfaces 30 and 32 are located at the far end of tail boom 28, providing a long moment arm to the vehicle's center of gravity, indicated by the legend C. G. The center of gravity is located near the center of the spherical configuration, and the center of buoyancy, indicated by legend C. B. is located aft and above the center of gravity. Location of the center of buoyancy above the center of the spherical configuration provides a buoyancy roll righting moment. Location of the center of buoyancy behind the center of gravity provides a counter moment which compensates that produced by horizontal tail surface 32, one of the functions of surface 32 being to provide lift in overcoming the vehicle's net buoyancy. The freely pivoted fairing 18 turns. Location of the rudder and elevator surfaces 30 and 32 at a long distance aft of the main body also avoids acoustical masking of transducer unit 12 by these members.

While the utility of vehicle 10 has been discussed in connection with a speed capability of 15 knots, it will be appreciated that such vehicle could be adapted for higher speeds, particularly by substituting a small nuclear energy-steam propulsion plant as the propulsion engine, since nuclear-steam type units can deliver more power for given size limits. Even higher speeds can be achieved by somewhat enlarging the size of the body to contain a nuclear energy-steam plant of higher rating than could be fitted in an embodiment of the relative compactness illustrated in the drawing.

Obviously many modifications and variations of the present invention are possible in the light of the above teachings. It is therefore to be understood that within the scope of the appended claims the invention be practiced otherwise than as specifically described.

What is claimed is:

1. A dirigible underwater drone vehicle for carrying an annular sonar signal receiving array formed from a plurality of linear arrays arranged as staves aligned in generally axial directions along the circumference of the annular array, comprising:
   (a) a hydrodynamic casing having a longitudinal axis of symmetry and a first spherical frontal and middle section forming a shape comprising more than half of a spherical surface so that the casing forms a spherically shaped outer surface at the vehicle maximum diameter and the rear edge of said first section is formed as a rearwardly converging spherical outer surface, said hydrodynamic casing having a second rear section forming a shape comprising a rearwardly converging frustoconical surface adjoining and extending from the rear edge of the first section, said second section of the hydrodynamic casing starting at an axial position ahead of the rear limit of the normal boundary layer separation point along the length of the surface of the spherical shape of the first section under forward motion in the direction of the hydrodynamic axis,
   (b) a tail boom affixed to the rear end of the rear section of the hydrodynamic casing and aligned about the hydrodynamic axis,
   (c) rudder and elevator control surfaces affixed to the rear end of the tail boom,
   (d) a set of wings in cruciform arrangement in the pitch and yaw planes at an axial position near to the maximum diameter of the first spherical section of the hydrodynamic casing,
   (e) an annular afterbody shroud disposed about the rear section of the hydrodynamic casing and about a forward section of the tail boom adjoining the point at which it is affixed to the hydrodynamic casing, the inner surface of said afterbody shroud co-operating with the frustoconical surface of the second rear section of the hydrodynamic casing to form an annular boundary layer induction and pump jet ducting channel, said boundary layer induction and pump jet induction channel comprising a first forward converging rearwardly extending axial section about the rear section of the hydrodynamic casing and a second axially extending rear section about said forward section of the tail boom,
   (f) self contained propulsion means including pump jet blades disposed in said second section of the boundary layer induction and pump jet ducting channel, and journaled about the tail boom,
   (g) means for supporting the annular sonar array in the upper hemispherical half of the hydrodynamic casing in concentric relationship about a vertical diametric reference line through the first spherical frontal and middle section of the hydrodynamic outer casing, and
   (h) the space between the hydrodynamic casing and the outer surface of the annular array being flooded with ambient water, and the wall of the hydrodynamic casing about said outer surface of the array being made of a material of the type forming an acoustically transparent material when backed with water.

2. A vehicle in accordance with claim 1 further for carrying a vertically oriented pole-type sonar signal transmission array;
   (i) said pole-type transmission array being affixed to the to the top of the upper one of said set of wings, and
   (j) a streamlined symmetric fairing member freely journaled about the pole-type transmission array through a journal axis ahead of the center of lift of the fairing.

3. A vehicle in accordance with claim 1, wherein;
   (k) said rear edge of the first section is located approximately one hundred and thirty-five degrees behind the longitudinal axis.

* * * * *